United States Patent
Murdoch

[19]

[11] Patent Number: 5,969,609
[45] Date of Patent: Oct. 19, 1999

[54] COUNTER-CURRENT RF FIELD ATTENUATOR USING LOOP TUBES

[75] Inventor: Graham Alexander Munro Murdoch, Leichhardt, Australia

[73] Assignee: Magellan Corporation (Australia) Pty Ltd, Australia

[21] Appl. No.: 08/765,549

[22] PCT Filed: Jul. 18, 1995

[86] PCT No.: PCT/AU95/00436

§ 371 Date: Jan. 17, 1997

§ 102(e) Date: Jan. 17, 1997

[87] PCT Pub. No.: WO96/02954

PCT Pub. Date: Feb. 1, 1996

[30] Foreign Application Priority Data

Jul. 18, 1994 [AU] Australia .............................. PM 6904

[51] Int. Cl.⁶ .................................................. G08B 13/187
[52] U.S. Cl. .................. 340/572.1; 333/81 R; 333/81 B; 340/551; 340/572.7; 340/693.5; 342/1; 342/4
[58] Field of Search .................................. 340/551, 572, 340/693, 572.1, 572.7, 693.5; 342/1, 4; 333/81 R, 81 B

[56] References Cited

U.S. PATENT DOCUMENTS

| | | |
|---|---|---|
| 3,904,886 | 9/1975 | Ehling . |
| 4,670,347 | 6/1987 | Lasik . |
| 4,720,606 | 1/1988 | Senn . |
| 5,258,766 | 11/1993 | Murdoch ................................. 340/572 |
| 5,373,296 | 12/1994 | Ishino et al. ................................. 342/4 |
| 5,793,305 | 8/1998 | Turner et al. ........................ 340/572.1 |

FOREIGN PATENT DOCUMENTS

| | | |
|---|---|---|
| 9214543 | 11/1995 | Australia . |
| 3709658 | 3/1988 | Germany . |
| 4127045 | 8/1991 | Germany . |
| 4127045 | 2/1993 | Germany . |
| 4-281690 | 10/1992 | Japan . |
| 795510 | 5/1958 | United Kingdom . |
| WO83/04157 | 11/1983 | WIPO . |
| WO90/05442 | 5/1990 | WIPO . |

OTHER PUBLICATIONS

International Search Report RE PCT/AU95/00436, filed Jul. 18, 1995.

*Primary Examiner*—Glen Swann
*Attorney, Agent, or Firm*—Baker & Daniels

[57] ABSTRACT

The attenuator is applicable to the art of identification, interrogation and communication equipment. The attenuator has particular application to equipment used in conjunction with smart cards, tags and like apparatus and including, in one form, an RF based technology, which has found a use in electronic ticketing, monitoring passenger movement and the identification and sorting of airline baggage and/or other items, such as containers or mail items. The attenuator, in one form, is predicated on the principle of creating a substantially opposing field, and applying this proximate the interrogator to substantially reduce stray field emissions. The attenuator, in another form, combines the physics of conducting tubes and self-cancelling fields and applies them to a tunnel interrogator. The attenuator thus applies a conducting tube which confines the field and the property of a loop generating a self-cancelling field to an interrogator. This combination may be called a "loop tube". In yet a further aspect, the loop tubes are arranged around the perimeter of the shield to suppress tangential field leakage that would normally be immune to the loop tube's suppressing action.

17 Claims, 6 Drawing Sheets

COUNTER-CURRENT RF FIELD ATTENUATOR USING LOOP TUBES

FIELD OF INVENTION

The present invention is applicable to the art of identification, interrogation and communication equipment. The present invention has particular application to equipment used in conjunction with smart cards, tags and like apparatus and including, in one form, an RF based technology, which has found a use in electronic ticketing, monitoring passenger movement and the identification and sorting of airline baggage and/or other items, such as containers or mail items.

BACKGROUND

A problem exists with stray fields. Magnetic fields may be used to provide power and to communicate with remote identification tags. These fields are generated by currents flowing in coils. To operate tags at distances considered useful, a substantial field at the tag is needed, and providing this field can lead to relatively significant stray magnetic fields beyond the tag. FIG. 1 illustrates this.

The emission of stray magnetic fields is limited by Regulations. Numerous attempts have been made to limit the emission of stray fields without unduly retarding the performance of interrogator/tag communication, but to date they have been considered relatively ineffective.

One form of prior art reduces the stray magnetic field generated by a coil by winding the coil in two oppositely directed halves, as illustrated in FIG. 2. While the field close to either half of the coil is unaffected by the other half, the stray field at a larger distance is reduced due to the fields cancelling each other.

Another form of prior art provides a conducting metal sheet greater than five electromagnetic skin depths thick for reflecting magnetic fields and acting as a screen against oscillating magnetic fields. In this way, the stray field from a coil can be screened by enclosing the coil in a metal box (FIG. 3). However, in many applications such a complete enclosure is not desirable. For example, where powering and communication with tags is needed such a box would require an opening(s) to allow the tag(s) to be passed through the box and near the coil for interrogation purposes. Despite the effectiveness of the metal screening, it has been found that providing openings will enable a relatively large amount of magnetic field to escape, and thus this is not considered desirable (FIG. 4).

Yet another form of prior art is disclosed in Australian Patent application No. 14543/92, filed in the name of Integrated Silicon Design Pty Ltd. In that application, FIGS. 8, 9A, 9B, 9C and 9D disclose various forms of field terminating structures. Effectively, the structures disclosed, at the interrogation frequency, serve to operate as a quarter wavelength long waveguide at the cut-off frequency. It is considered that this structure not suitable for attenuating lower frequency magnetic fields, such as those used in the identification, sorting and location of baggage and other items.

SUMMARY OF INVENTION

The present Applicant developed an RF interrogator for providing a substantially uniform 3D field (U.S. Pat. No. 5,258,766). This interrogator has enabled communication, powering and identification of tags passing through the interrogator in a substantially orientation insensitive manner.

Following on from that development, the present applicants have sought to develop a further refinement preferably applicable to interrogators in respect of their field emissions, particularly, but not exclusively, in relation to a 3D field interrogator.

Furthermore, the regulations relating to stray emissions have been made more stringent, which has placed a greater requirement on those who manufacture and sell identification and interrogation equipment to reduce the stray emissions from interrogation equipment. On the other hand, the requirement to generate magnetic fields of substantial magnitude for the interrogation of tags at relatively useful distances has been found to make it difficult to operate tag identification systems without contravention of these regulations.

The present invention is directed to addressing what is considered a long felt need with regard to field emissions from interrogators.

It is an object of the present invention to alleviate a disadvantage associated with the prior art.

Another object of the present invention is to provide a field terminating structure which serves to reduce the stray field emission associated with an interrogator.

FIRST ASPECT

The present invention, in one form, is predicated on the principle of creating a substantially opposing field, and applying this proximate the interrogator to substantially reduce stray field emissions.

The present invention, in this form, provides an attenuator including at least one relatively low resistance loop adapted to generate a substantially opposing field.

SECOND ASPECT

The present invention, in another form, combines the physics of conducting tubes and self-cancelling fields and applies them to a tunnel interrogator. The invention thus applies a conducting tube which confines the field and the property of a loop generating a self-cancelling field to an interrogator. This combination may be called a "loop tube" and has been found to be advantageously useful in 3D interrogator systems, although it may be used in other systems.

This combination serves to attenuate fields which exit and re-enter through different portals (normal fields). It has also been found that the present invention can serve to attenuate tangential fields, which fields exit and re-enter through the same portal. The tangential field attenuation is considered to be a significant advance in the art.

THIRD ASPECT

In yet a further invention, the loop tubes are arranged around the perimeter of the shielded enclosure openings to suppress tangential field leakage that would normally be relatively unaffected by the loop tube's attenuating action.

This invention can be used to minimise the magnetic leakage from the entrance and exit portals of a screening enclosure, such as an interrogator. The size of these portals in prior art devices usually allow the field leakage to exceed regulatory limits.

The positioning of loop tubes proximate the entrance and exit portals in the interrogation path has been found to reduce the tangential field. In one form, placement of the loop tubes proximate the perimeter of the portals has been found to significantly enhance attenuation.

BRIEF DESCRIPTION OF THE DRAWINGS

Embodiments of the present invention will now be described with reference to the accompanying drawings, wherein.

DETAILED

Figure 5:
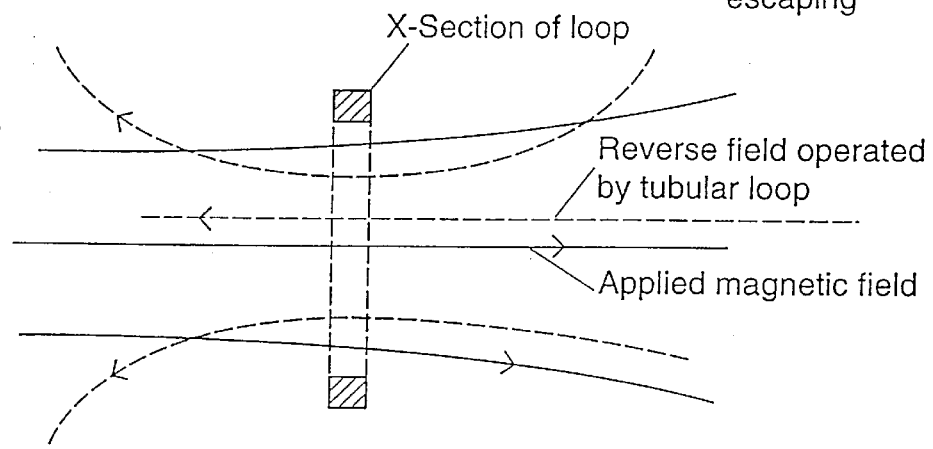
FIG. 5 shows an example of the principle applied in the present invention.

In principle, when an AC magnetic field passes through a loop it induces a voltage in the loop. If the loop ends are shorted together, a current will flow such that the magnetic field generated by that current opposes the applied field (FIG. 5). The present invention is based, in part, on the application of this phenomenon to the present field of invention in such a way that the resultant opposing field is used to reduce or alleviate stray emission.

Figure 6:
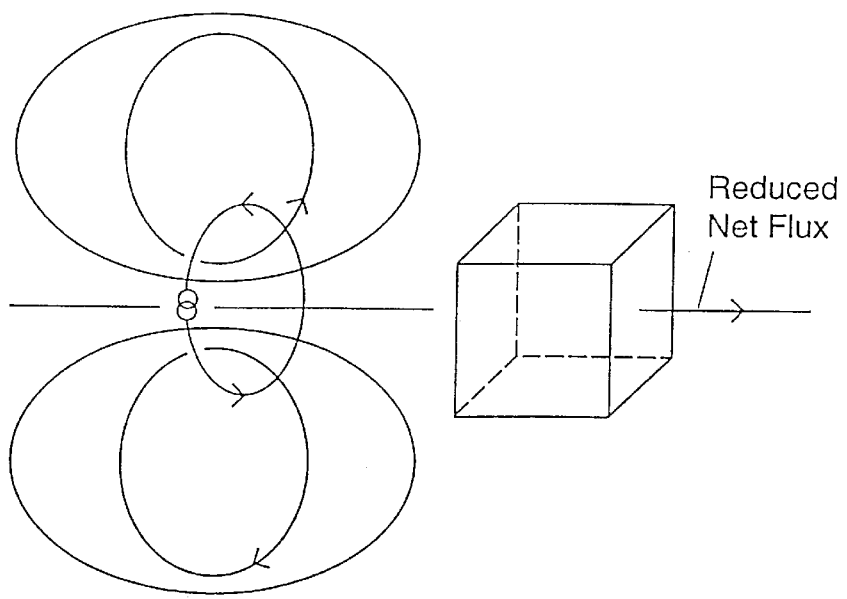
FIG. 6 shows the operation of the present invention where the field is normal to the plane of the opening.

The total net magnetic flux passing through the coil is given by the ratio of the loop resistance to its total impedance. For a low resistance loop, the net flux passing through the loop will always be a small fraction of the original applied field. Taking this further, it has been realised that a substantially low resistance loop can constructed by folding a metal sheet to form a tube (FIG. 6). Such a 'loop' tube may have an extremely low resistance. By placement of such a tube loop proximate the exits of a device which generates and radiates an interrogating magnetic field, the tubular loop structure disclosed can be used to suppress or at least attenuate the magnetic field extending beyond the exits, as the field emissions trying to penetrate or proximate the loop generate a substantially opposing field. It has been found that the tube loop can be devised in accordance with the above disclosures so that the opposing field generated is nearly equal in magnitude to the stray magnetic field.

By way of explanation, an alternating magnetic field is considered unable to penetrate beyond five electromagnetic skin depths into any conducting material. This is caused by surface eddy currents induced by the applied electromagnetic field. The eddy currents generate their own field, which by Lenz's law, is opposed to the applied field. This reverse field subtracts from the impinging field. As the impinging field penetrates into the conductor a greater and greater proportion of it is subtracted till a negligible amount remains at a depth of five electromagnetic skin depths. The reverse field emerges from the surface of the conductor and is present above the conductor surface. The impinging and reverse magnetic fields add vectorially above the surface of the conductor producing a new resultant field. Thus an alternating magnetic field is distorted near conducting objects.

For good conductors (metals) the skin depth is very shallow (180 $\mu$m for copper at 132 KHz) and thus very little of any applied field can penetrate into the metal. Instead the applied field "flows" around any conductors of dimension larger than five electromagnetic skin depths.

This fluid like "flowing" of the field around large conductors is the net effect of the reverse field generated by the eddy currents on the surface of the conductor. Thus thick metal plates or structures can be used to channel, block or screen an applied alternating magnetic field.

It is also considered difficult for a magnetic field to penetrate through a hole in a conductor. The perimeter of the hole is a shorted loop and an alternating magnetic field penetrating the hole will cause (by induction) eddy currents to flow around the hole perimeter. These will generate a magnetic field that subtracts from the applied field. The net magnetic field that can pass through the hole is a small fraction of the originally applied field.

It is considered that the utilisation of a substantially low resistance "loop tube" placed proximate the source or exit point of stray emission will serve to confine the field(s) and create a substantially opposing field having a magnitude sufficient to reduce the stray emission field.

The structure shown in FIG. 6 may be used to reduce a stray field emanating in a substantially normal direction.

Reducing the magnetic field leakage from a screened enclosure (box) can be done by placing structures at the entrance to any openings into the enclosure. Depending upon the orientation of the field generated, different types of structures can be devised.

Figure 1:
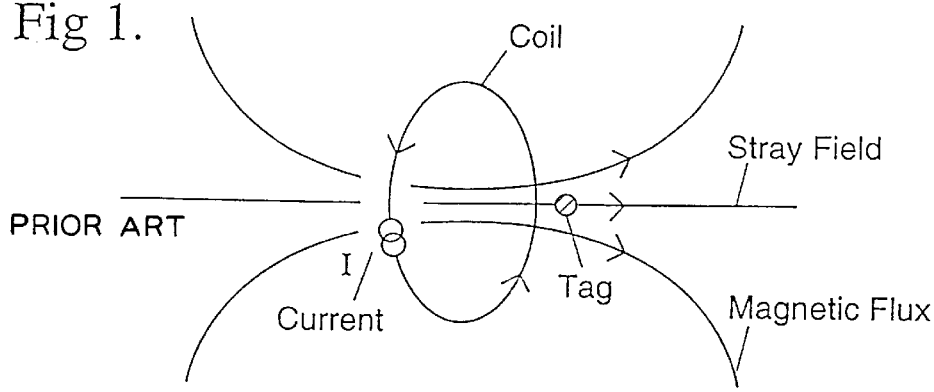
FIGS. 1, 2, 3 and 4 illustrate various prior art structures and stray field emissions.
Figure 2:
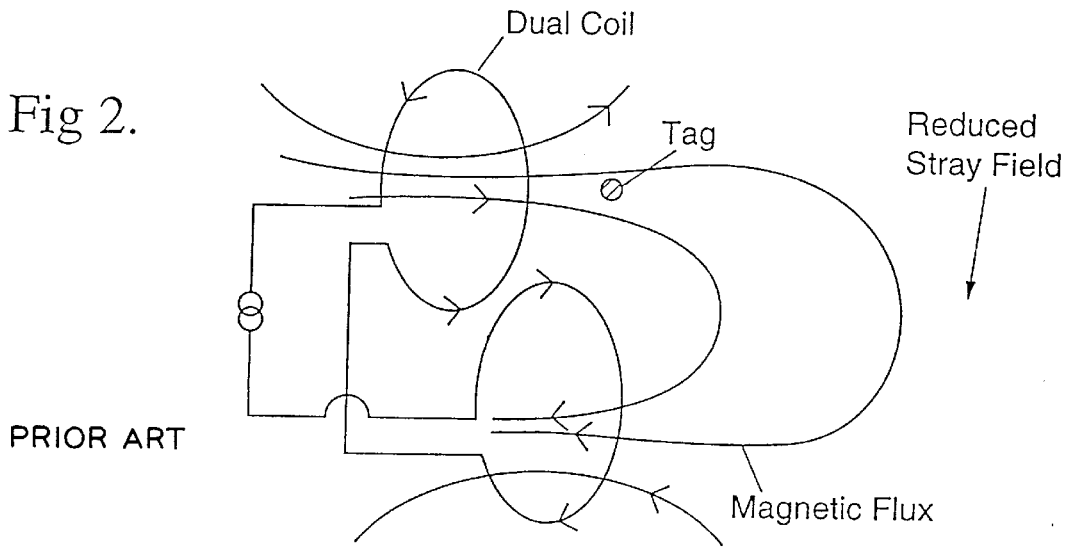
Figure 3:
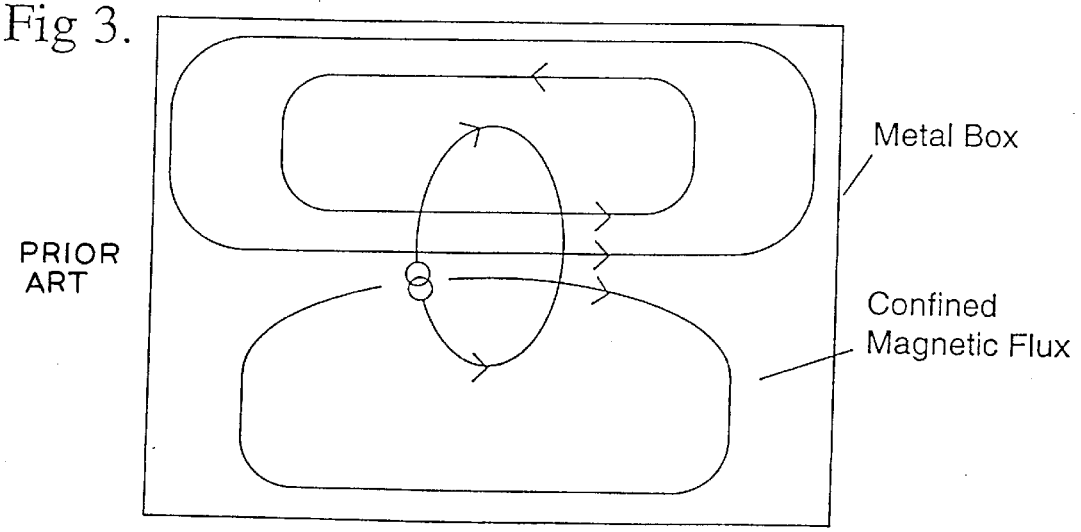
Figure 4:
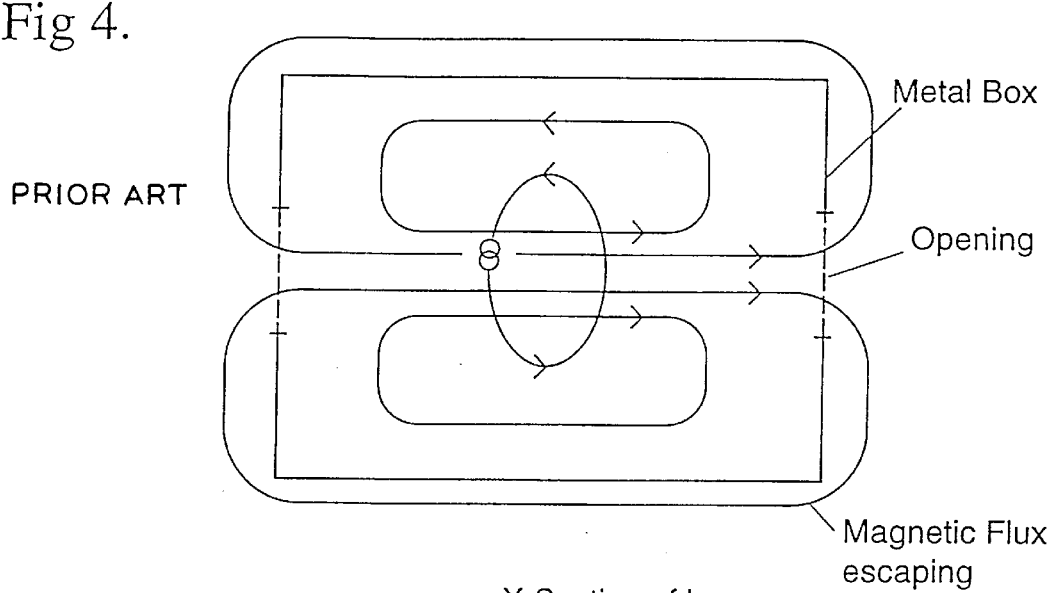

For stray fields emanating in the direction generally normal to the plane of the opening, the field emerges from one opening and re-enters the enclosure through a different opening (FIG. 4).

Figure 7:
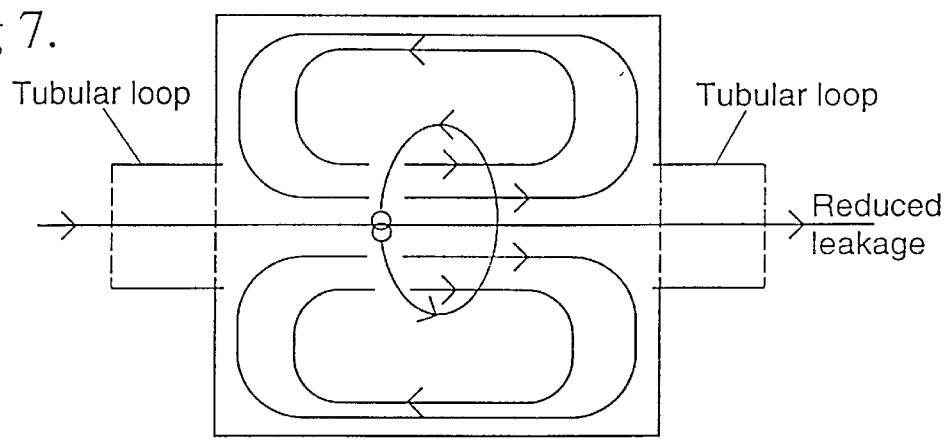
FIG. 7 shows the present invention operative where the field is generally normal to the plane of opening.

Attaching tubular loops at each opening will substantially attenuate or suppress the leakage of these stray fields (FIG. 7).

Also by way of explanation, it has been realised that magnetic fields form continuous closed magnetic circuits and thus a magnetic field leaking from the screened enclosure must re-enter the enclosure either through the same portal it exited from or through a different portal. Thus there are two modes of magnetic leakage:

(a) the field exits and re-enters through different portals (normal field)

(b) the field exits and re-enters through the same portal (tangential field).

Figure 8:
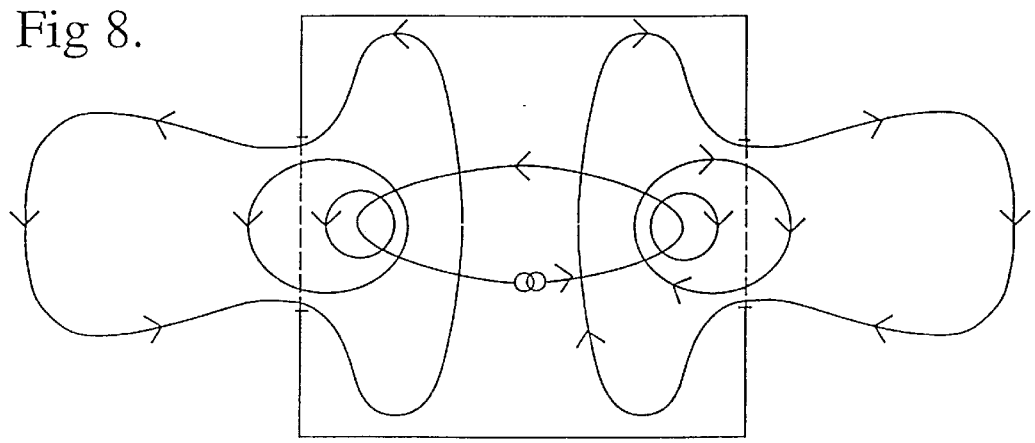
FIGS. 8 and 9 show the present invention as applied where the field is generally tangential to the plane of the opening.
Figure 9:
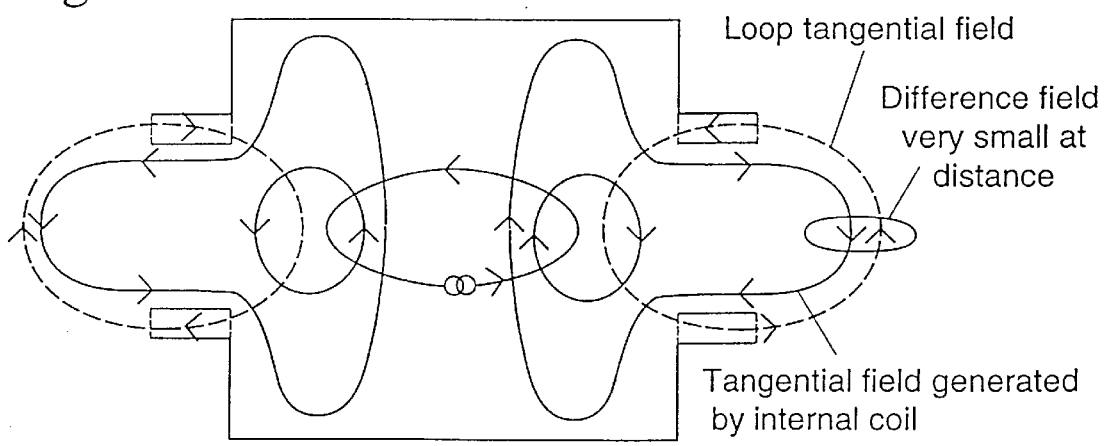

By positioning loop tubes which are contiguous with the metallic screen the leakage field can be channelled through the loop tubes. Where the leakage field is of the normal type then the reverse field generated by the loop will cancel or reduce most of the leakage field. The longer the tube the better the cancellation.

Where the field is emanating in the direction generally tangential to the plane of the opening, the field emerges and re-enters through the same opening (FIG. 8). Thus the total flux passing through the opening is substantially zero and the tubular loop used in the normal direction will not attenuate the field. However, tubular loops placed proximate the perimeter of the opening(s) have been found to generate their own external tangential directional fields that will subtract from the stray tangential field (FIG. 9).

At distances of a few meters, the tube loop may be constructed to have an external field that substantially reduces or nearly cancels the tangential leakage field.

Figure 10:
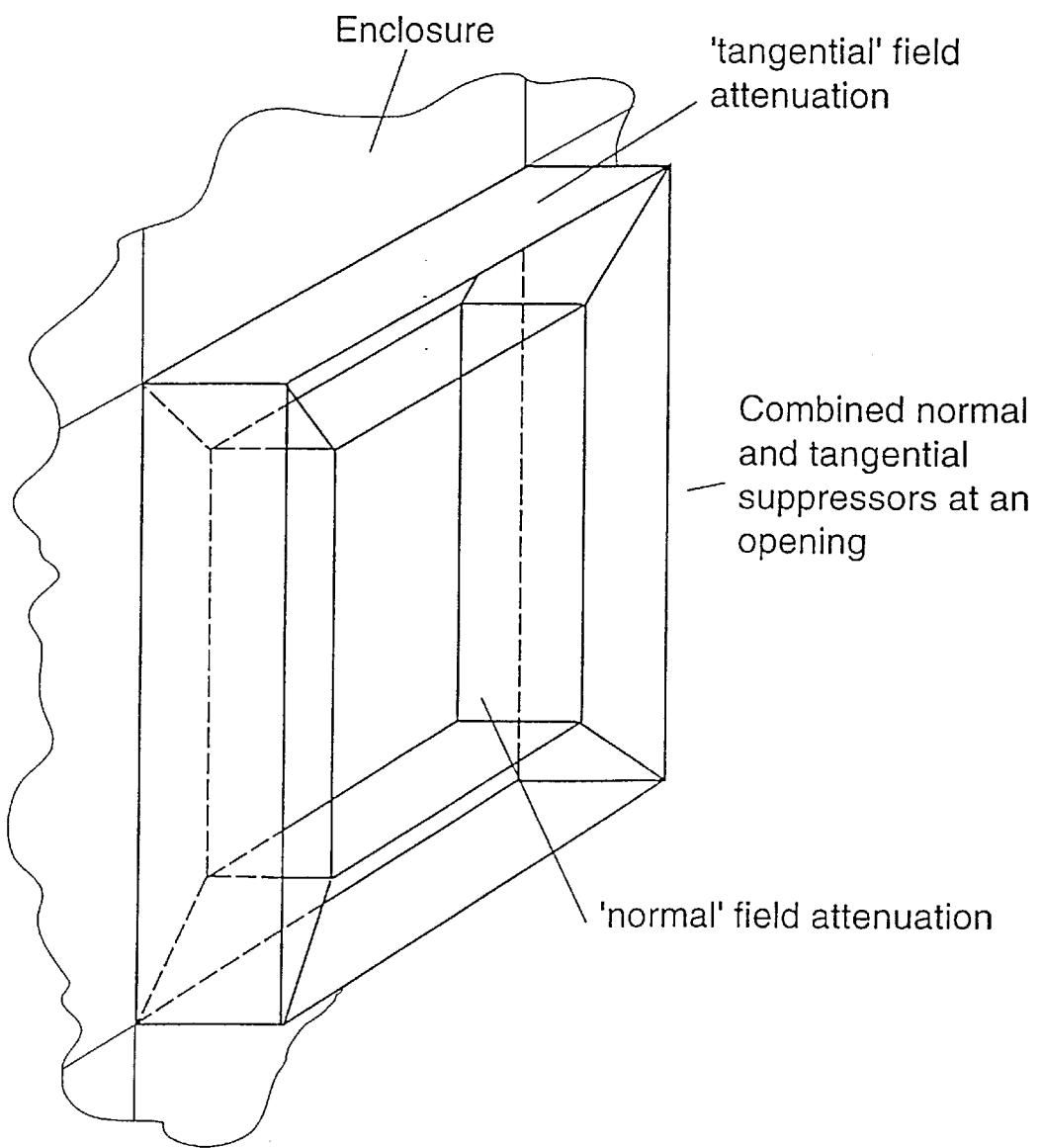
FIG. 10 shows one embodiment of the 3D tube loop.

By segmenting the tubular loops attached around the perimeter of each opening and butting them together, the structures disclosed may be combined together (FIG. 10). Preferably, the relatively small loop tubes may be placed around the perimeter of portal(s) in the interrogation path in order to attenuate the tangential field.

Figure 11A:
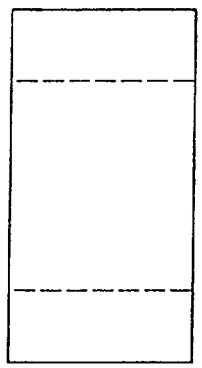
FIG. 11*a* shows a side elevation view of the embodiment shown in FIG. 10.
Figure 11B:
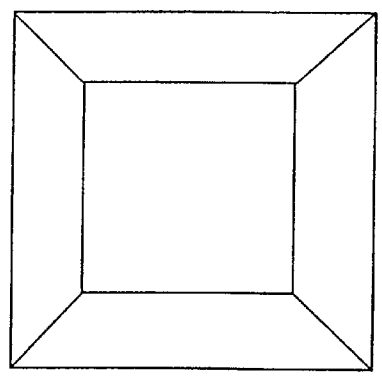
FIG. 11*b* shows a front elevation view of the same embodiment.
Figure 11C:
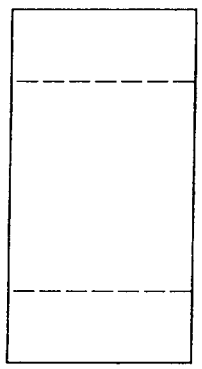
FIG. 11*c* shows a side elevation of this second embodiment.
Figure 11D:
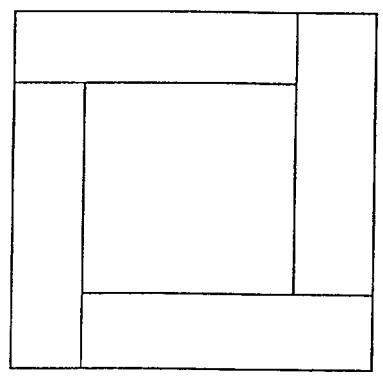
FIG. 11*d* shows a front elevation view of a second embodiment of the present invention.
Figure 11E:
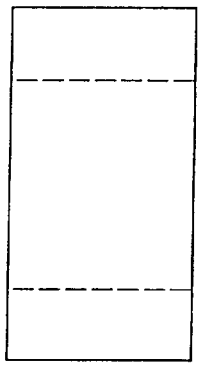
FIG. 11*e* shows a side elevation of this third embodiment.
Figure 11F:
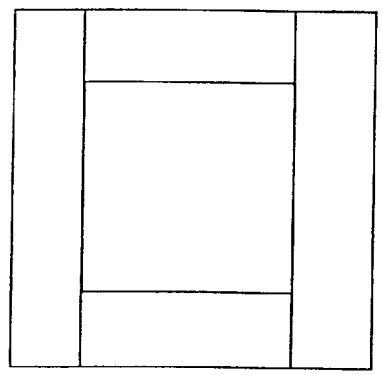
FIG. 11*f* shows a front elevation view of a third embodiment of the present invention.
Figure 12A:
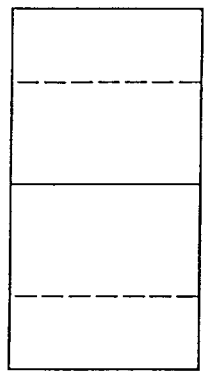
FIG. 12*a* shows a side elevation of this fourth embodiment.
Figure 12B:
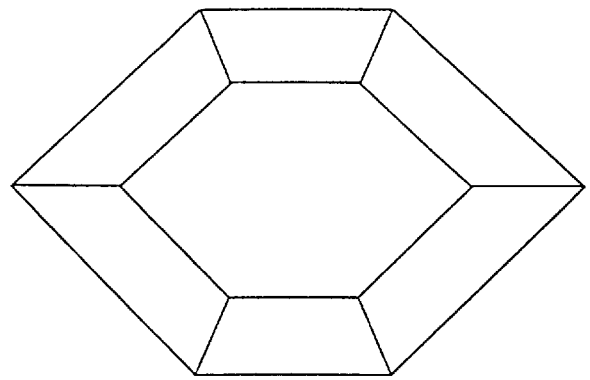
FIG. 12*b* shows a front elevation view of a fourth embodiment of the present invention.
Figure 12C:
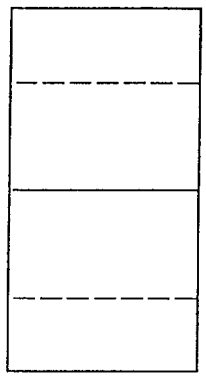
FIG. 12*c* shows a side elevation of the fifth embodiment.
Figure 12D:
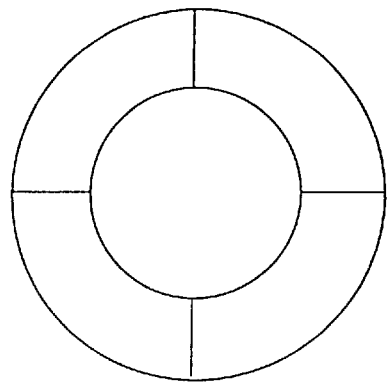
FIG. 12*d* shows a front elevation view of a fifth embodiment of the present invention.
Figure 12E:
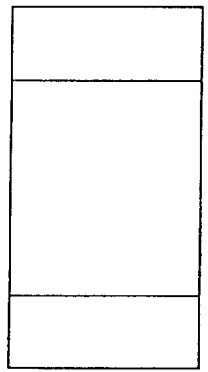
FIG. 12*e* shows a side elevation of this sixth embodiment.
Figure 12F:
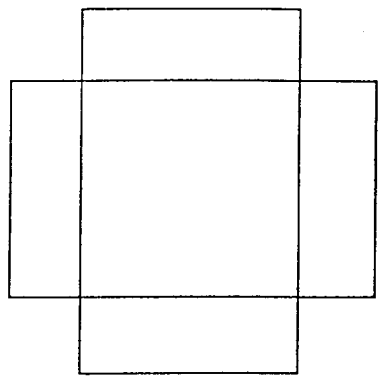
FIG. 12*f* shows a front elevation view of a sixth embodiment of the present invention.

Various other preferred embodiments of the present invention, including the loop tube are illustrated in FIGS. 11a to 11f and FIGS. 12a to 12f. FIGS. 11a and 11b are side and front elevational views of the embodiment of the loop tube that is shown in FIG. 10. The loop tube can be constructed in a variety of different ways by modifying the manner in which the loop tube segments are butted together, as shown in FIGS. 11c–11f. FIGS. 12a and 12b show a six sided configuration. FIGS. 12c and 12d show a circular configuration. FIGS. 12e and 12f are two views of a further embodiment wherein the segments are abutted at adjacent corners.

The electronic model for a loop tube may be a series connected voltage source VM, inductance L and resistance r. The voltage source is the voltage induced by the leakage field. The inductor is the loop inductance and the resistance is the loop surface resistance at the operating frequency. A current "i" circulates in the series circuit.

$$V_M = \frac{d}{dt}(\Psi_M) = S\Psi_M$$

$$i = \frac{V_M}{SL+r} = \frac{S\Psi_M}{SL+r}$$

where $\Psi_M$ is the magnetic flux impinging upon the loop tunnel and S is the complex frequency. The reverse flux $\Psi_R$ generated by i is given by $$\Psi_R = Li = \frac{SL\Psi_M}{SL+r}$$

hence the total net flux $$\Psi_T \text{ is } \Psi_T = \Psi_M - \Psi_T = \frac{r}{SL+r}\Psi_M$$

For example, for a loop tube of diameter 1 m and length 0.5 m has L≈4 µH and r≈0.5 mΩ.
SL>>r for S=2π×132 KHz and $$\Psi_T \approx \frac{\Psi_M}{SL}$$

which for the given value of SL represents an attenuation of $\Psi_M$ by $1.5\times10^{-4}$ or −76dB.

For a tangential field, the leakage field exits and re-enters through the same portal. The net impinging magnetic flux ΨM is then zero and hence VM=0 and i=0 and no attenuation of the tangential field can occur with a simple loop tube. What has been realised is that a combination of loop tubes can be used to suppress the tangential leakage field.

The tangential field exits and re-enters along the walls of a portal as shown in FIG. 8. Suppression of these field components requires the positioning of loop tubes on the walls of each portal. These loop tubes then suppress the wall leakage fluxes as detailed above. The tangential fields are cancelled at a distance by the reverse fluxes generated in these loop tubes as shown in FIG. 9.

Although the above disclosure has been made with reference to fields emanating in three dimensions (x, y and z) and mix thereof, it is contemplated within the scope of the present application to utilise the tube loop in any one of or a combination of the three dimensions and whether normal, tangential or otherwise, depending on the direction and/or magnitude of the stray field(s) which are to be reduced.

I claim:

1. An attenuator including a loop tube.
2. An attenuator as claimed in claim 1, being a RF field attenuator.
3. An attenuator as claimed in claim 2, adapted to attenuate a tangential field.
4. An attenuator as claimed in claim 2, wherein the loop is adapted to reduce stray emissions in any one of or all of 3 dimensions, x, y, z.
5. An interrogator including the attenuator of claim 2.
6. An attenuator as claimed in claim 1, adapted to attenuate a tangential field.
7. An attenuator as claimed in claim 6, proximate the perimeter of a portal in an interrogation path.
8. An attenuator as claimed in claim 7, wherein the loop is adapted to reduce stray emissions in any one of or all of 3 dimensions, x, y, z.
9. An interrogator including the attenuator of claim 7.
10. An attenuator as claimed in claim 6, wherein the loop is adapted to reduce stray emissions in any one of or all of 3 dimensions, x, y, z.
11. An interrogator including the attenuator of claim 6.
12. An attenuator as claimed in claim 1, wherein the loop is adapted to reduce stray emissions in any one of or all of 3 dimensions, x, y, z.
13. An interrogator including the attenuator of claim 12.
14. An interrogator including the attenuator of claim 1.
15. An interrogator as claimed in claim 14, adapted for RF interrogation and/or communication.
16. A loop tube for use with an interrogator.
17. A loop tube for use in association with an interrogation apparatus, the loop tube comprising:

a conducting tube of relatively conductive material for confining an impinging field emanating from an interrogator; and the tube being formed as a conductive loop in order to generate an opposing field in response to the impinging field, such that in use the loop tube substantially attenuates a stray field emissions component of the impinging field.

* * * * *